United States Patent [19]

Braus et al.

[11] Patent Number: 4,548,865
[45] Date of Patent: Oct. 22, 1985

[54] SILANES USEFUL AS ANTI-TREEING ADDITIVES

[75] Inventors: Harry Braus; Anthony Barlow; Melvin F. Maringer, all of Cincinnati, Ohio

[73] Assignee: National Distillers and Chemical Corpooration, New York, N.Y.

[21] Appl. No.: 690,704

[22] Filed: Jan. 11, 1985

Related U.S. Application Data

[62] Division of Ser. No. 575,975, Feb. 1, 1984, Pat. No. 4,514,536.

[51] Int. Cl.⁴ .............................................. B32B 15/00
[52] U.S. Cl. .................................. 428/379; 428/391; 524/261; 549/214
[58] Field of Search ................ 428/379, 391; 524/261; 549/214

[56] References Cited

U.S. PATENT DOCUMENTS 3,950,364  4/1976  Vahlensieck et al. .............. 549/214
4,144,202  3/1979  Ashcraft et al. .................... 524/114
4,172,806  10/1979  Vincent ........................... 174/110 S
4,299,713  11/1981  Maringer et al. .................. 524/261
4,400,429  8/1983  Barlow et al. ..................... 524/261

FOREIGN PATENT DOCUMENTS 2737430  2/1979  Fed. Rep. of Germany .

OTHER PUBLICATIONS

Chemical Abstracts, vol. 90, 1979–90:72700i.

Primary Examiner—Joseph L. Schofer
Assistant Examiner—N. Sarofim
Attorney, Agent, or Firm—Kenneth D. Tremain

[57] ABSTRACT

Vinyltrisfurfuryloxysilane having the formula

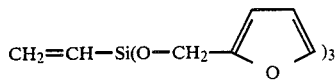

useful as a water tree and electrical tree for polymeric compositions.

7 Claims, No Drawings

SILANES USEFUL AS ANTI-TREEING ADDITIVES

This is a divisional of copending application Ser. No. 575,975, filed on Feb. 1, 1984, now U.S. Pat. No. 4,514,536.

BACKGROUND OF THE INVENTION

1. Field of the Invention

This invention relates to silane monomers and more particularly to certain substituted silanes useful as anti-treeing additives for polymeric compositions.

2. Background of the Invention

Organosilanes have found wide use as lubricants, hydraulic fluids, coupling agents in mineral filled polymeric compositions, dielectric fluids, water repellants, tree retardant additives for polymeric electrical insulation and intermediates in preparing organopolysiloxanes.

For example, U.S. Pat. No. 2,559,342 of Burkhard discloses a family of hydrocarbyl alkoxyethoxy silanes prepared by reacting organochlorosilanes with alkoxyethanols. U.S. Pat. No. 3,814,691 of Csejka et al. discloses organo silanes useful as hydraulic fluid base stock. These silanes have the general formula:

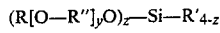

wherein R is a $C_1$-$C_{10}$ alkyl or a $C_6$-$C_{10}$ aryl group, R' is a $C_1$-$C_4$ alkyl group, R'' is a $C_2$-$C_4$ alkylene group, y is 1 to 5 and z is 1 to 3. U.S. Pat. Nos. 3,048,499 to Jellinek and 2,851,474 of Pines et al. disclose divinyldialkoxysilanes while British Pat. No. 943,421 discloses arylsilanes. U.S. Pat. No. 4,141,851 of Askew discloses silanes, useful in hydraulic fluids, having the formula

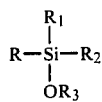

wherein the most pertinent version of the broad general formula requires two Si—C bonds and two Si—O—C bonds on the single Si atom.

U.S. Pat. No. 4,172,806 to Vincent discloses furfuryloxy substituted silanes, useful as dielectric fluids, of the general formula

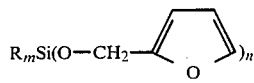

wherein R is selected from the group consisting of monovalent hydrocarbon radicals having from 1 to 10 carbon atoms, m has a value of 1 to 3, n has a value of 1 to 3 and m+n=4. Vinylfurfuryloxy substituted silanes are not specifically disclosed by Vincent nor their use as anti-treeing agents.

Copending U.S. patent application Ser. No. 161,932, now U.S. Pat. No. 4,299,713, discloses the addition of organo silanes to polymeric compositions to provide increased resistance to the phenomena known as electrical treeing and water treeing, same compositions being useful as insulation for electrical cables.

Polymeric compositions are well-known and are used extensively as insulation materials for wire and cable. As an insulator, it is important that the composition have various physical and electrical properties, such as resistance to mechanical cut-through, stress crack resistance and dielectric failure. Recent publications have indicated that water tree growth and electrical tree growth in the insulation are particularly important problems since they are associated with, though not necessarily totally responsible for, dielectric failure. The term "tree" has been applied to this type of insulation breakdown since the area of failure is a void space having the appearance of a tree in profile, i.e. the shape of a tree trunk and its upper foliage. Treeing usually is a slowly developing phenomenon and may take years to cause a failure in the insulation.

An important application for an insulation material is in high voltage transmission and distribution cable, especially in direct buried underground service. Two types of trees have been observed in these power cables, to wit, electrical trees and water trees, which are sometimes referred to as electrochemical trees. It is generally believed that electrical trees are generated by corona discharges causing fusion and breakdown of the polymer, whereas water trees are usually observed in cables buried in wet locations and have a different appearance compared to the electrical trees. Metal ions are usually found in water trees.

U.S. Pat. No. 4,144,202 of Ashcraft et al. relates to inhibiting the electrical breakdown or insulation by water treeing in dielectric materials based on ethylene polymers. As disclosed in the patent, water treeing is inhibited in the ethylene polymer compositions by employing therein organo silane compounds having an epoxy containing radical. German Offenlegungsschrift No. 2,737,430 discloses that certain alkoxysilanes added to polyolefin insulation prevent water-tree formation. Commonly assigned and copending U.S. patent application Ser. No. 161,932, filed June 23, 1980 discloses a number of organosilanes useful as tree retardant additives. Those particularly preferred contain at least one —$OC_2H_4$—O—R group where R is alkyl or aryl. Vinyltris (2-phenoxyethoxy)silane is specifically disclosed and exemplified as a useful water tree and electrical tree retardant for polymeric insulation.

SUMMARY OF THE INVENTION

Accordingly, it is an object of this invention to provide novel vinyltrisfurfurloxysilanes.

It is another object of this invention to provide novel vinyltrisfurfuryloxysilanes useful as water tree and electrical tree retardants.

These and other objects are accomplished herein by providing a vinyltrisfurfuryloxysilane having the formula:

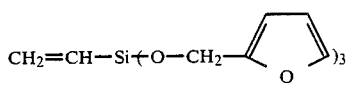

and polymeric compositions containing the same.

DETAILED DESCRIPTION OF THE INVENTION

The vinyltrisfurfuryloxysilane of the present invention can be prepared by the reaction of a vinyltrihalosilane, such as vinyltrichlorosilane, and furfuryl alcohol in the presence of a hydrohalide acceptor such as pyridine, dimethylaniline and the like.

In a further embodiment of the present invention, the afore-described vinyltrisfurfuryloxysilane is incorporated in polymer compositions to provide excellent tree retardant properties to the polymer.

In general the polymers suitable for the practice of this invention include any normally solid synthetic organic polymeric thermoplastic resin. Included are polyolefins and copolymers thereof, vinyls, olefin-vinyl copolymers, polyamides, acrylics, polystyrenes, cellulosics, polyesters and fluorocarbons.

The polyolefins include normally solid polymers of olefins, particuarlly mono-alpha-olefins, which comprise from about two to about six carbon atoms, e.g., polyethylene, polypropylene, polybutene, polyisobutylene, poly(4-methylpentene), and the like. Preferred polyolefins are polyethylene and polypropylene. Polyethylene is especially preferred. Specific polyethylenes include linear low density polyethylene, high density polyethylene and low density polyethylene. An especially preferred polyethylene because of its demonstrated effectiveness is termed NA 310 and is sold by National Distillers and Chemical Company.

Copolymers of ethylene, and other compounds interpolymerizable with ethylene such as butene-1, pentene-1, styrene and the like may be employed. In general the copolymer will comprise about 50 weight % or more ethylene. Other copolymers, such as ethylene-propylene rubber (EPR) and ethylene-propylene-diene monomer (EPDM) are also contemplated herein.

Suitable vinyl polymers include polyvinyl chloride polyvinyl acetate, vinyl chloride/vinyl acetate copolymers, polyvinyl alcohol and polyvinyl acetal.

Suitable olefin-vinyl copolymers include ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and the like. In general the ethylene constitutes at least about 25% of the copolymer by weight.

Olefin-allyl copolymers include ethylene-allyl benzene, ethylene-allyl ether, ethylene-acrolein, and the like.

When it is desired to use a polymeric composition which can be crosslinked, crosslinking can be accomplished by any of the known procedures such as chemical means including peroxide cross-linking; by radiation using electron accelerators, gamma-rays, high energy radiation, such as X-rays, microwaves etc.; or by thermal crosslinking. The basic procedures for crosslinking polymers are extremely well known to the art and need not be described here in detail.

Conventional crosslinking agents such as organic peroxides may be suitably employed. Typical organic peroxide free radical generators include dicumyl peroxide; 2,5-bis(tert.-butylperoxy)-2,5-dimethylhexane; di-t-butyl peroxide; benzoyl peroxide, α, α'bis(t-butylperoxy)diisopropyl benzene and the like, as discussed in U.S. Pat. No. 3,287,312. The amount of organic perioxide, when employed, will range from about 0.5 to 5.0% by weight based on the total weight of the composition, or about 0.5 to 10 phr., preferably 3 to 6 phr.

Minor amounts of other additives may also be employed in conventional amounts to obtain the desired results. Conventional antioxidants such as the hindered phenols, polyquinolines and the like may be employed. Other ingredients that may be included are plasticizers, dyes, pigments, heat and light stabilizers, antistatic agents and the like.

The compositions of this invention are generally unfilled polymer compositions. The term "unfilled" as applied to the instant composition shall mean a composition which contains less than 10% of a conventional polymer filler. For certain applications and to meet particular specifications the unfilled compositions herein may contain no filler. The compositions of this invention may contain, therefore, 0 to less than 10% filler. When polymers such as ethylene-propylene rubber (EPR) and ethylene-propylene-diene monomer (EPDM) are employed however, from about 20% to about 30% filler are generally used. Such compositions are also intended to be within the scope of this invention. Accordingly, fillers, such as mineral fillers, may be employed to this limited extent in preparing the compositions of the invention, but in the particularly preferred embodiment and for certain uses, these compositions contain no fillers.

The polymer compositions of this invention can be prepared by mixing the various ingredients. When the organic compound and the polymeric component are mixed together to form the instant compositions, the organic compound and polymeric component are homogeneously dispersed in each other. The order of mixing and specific procedure employed are not critical except to the extent that from the time the peroxide is added, if employed, the temperature is less than about 130° C. in order to prevent premature curing of the composition. This precaution, however, is conventional in the art.

The components may be mixed on a variety of apparatus including multi-roll mills, screw mills, continuous mixers, compounding extruders and Banbury mixers.

In general, the water tree and electrical tree properties in polymeric high voltage cable insulation are improved by blending into such insulation material about 0.1 to about 5% of the vinyltris(furfuryloxy)silane.

After being extruded onto wire or cable, or other substrate, the crosslinkable compositions are vulcanized at elevated temperatuers, e.g., above about 180° C. using conventional vulcanizing procedures.

In order to determine the utility and effectiveness of the polymeric compositions of the present invention with regard to its inhibiting effect on the water treeing and the electrical treeing thereof, the compositions were evaluated by the use of accelerated tests.

Electrical tree tests were performed using the method similar to that in IEEE Conference Paper No. C73, 257-3 1973 by E. J. McMahon and J. R. Perkins. Strips of material approximately 1" wide were cut from a ¼" thick compression molded plaque. The block was machined to give a strip having parallel edges 1" apart. The strip was then cut into 1" square blocks. A blunt needle and a sharp needle were inserted into opposite parallel edges, at elevated temperatuers, so that the points were ⅛" apart. Needle insertion and cooling of the sample was performed slowly to avoid inducing thermal or mechanical stresses in the specimen. The sharp needle has a tip diameter of about 0.0002" while the diameter of the blunt needle is 0.002". Eight specimens were prepared and tested simultaneously for each composition. The electrical tree test was performed by energizing the sharp needle at 15 KV using a frequency of 60 Hz; the blunt needle was connected to ground. The time required for each of the eight specimens to fail by tree growth and subsequent electrical short was recorded. The time required for 50% of the samples to fail was employed to characterize the effectiveness of the tree retardant being evaluated.

The water tree test is performed using a procedure similar to that described in U.S. Pat. No. 4,144,202. A compression molded disc about 150 millimeters (mm.) in diameter having 10 conical depressions was prepared for each composition. The geometry of the disc and dimensions of the depressions are substantially the same as shown in U.S. Pat. No. 4,144,202. The base of the disc is sprayed with silver paint which serves as the ground electrode. An acrylic tube 6" long is clamped to the upper face forming a test cell. About 150 ml of 0.01N sodium chloride solution was poured into the cell and the air bubbles trapped on the surface of the sample were removed. A platinum wire ring was then immersed in the electrolyte and connected to the electrical supply which provides 5 KV at a frequency of 3 KHz. Samples were energized for 22 hours after which time they were removed from the test cell and washed with distilled water. The ten depressions were cut from the disc and stained to make the water trees more visible. Thin sections were obtained with a microtome, which were then examined microscopically (at 200X) and the tree size measured. Normally four discs were made for each sample so that the average tree size is calculated from forty individual measurements. In evaluating different tree retardants, the relative tree size was determined by comparing the average tree size obtained on a standard thermoplastic high voltage insulation material containing no tree retardant additives.

Various embodiments of the present invention will now be illustrated by reference to the following specific examples. It is to be understood, however, that such examples are presented for purposes of illustration only, and the present invention is in no way to be deemed as limited thereby.

EXAMPLE 1

Synthesis of Vinyltrisfurfuryloxysilane

To a flask containing 48.5 ml. of vinyltrichlorosilane were added 48.5 ml. of pyridine and 300 ml. of anhydrous ether. A mixture of 103.7 ml. of furfuryl alcohol and 48.5 ml. pyridine was added slowly to the flask at 10°–15° C. The resulting salt was filtered off and the ether distilled. The residue was vacuum distilled and the fraction recovered at 188° C. (3 mmHg) was identified by NMR as vinyltrisfurfuryloxysilane.

EXAMPLE 2

Alternate Preparation of Vinyltris(furfuryloxy)silane

To a solution of 86.5 ml. furfuryl alcohol in 200 ml. toluene was slowly added 23 g. sodium metal. An additional 10 ml. furfuryl alcohol was added and the solution was heated to 100° C. with stirring to convert all the sodium. The solution was cooled to ice temperature and 43.5 ml. vinyltrichlorosilane dissolved in 50 ml. toluene was slowly added. After the addition was complete, the mixture was heated at 95° C. for 0.5 hr. The colloidal sodium chloride by-product was extracted with water. The organic phase was filtered and the toluene removed by vacuum evaporation. The residue was distilled at 2 mmHg and the product recovered at 182°–184° C.

EXAMPLE 3

The effectiveness of 1.5 wt.% vinyl(tris furfuryloxy) silane as a tree retardant additive in polyethylene insulation (NA310-06) can be seen from the following test data:

| | Water tree Size μm | Electrical tree Failure time $F_{50}$ mins. |
|---|---|---|
| NA310-06 (control) | 210 | 75 |
| Vinyltrisfurfuryloxysilane | 37 | 600 |

Obviously, other modifications and variations of the present invention are possible in the light of the above teachings. It is, therefore, to be understood that changes may be made in the particular embodiment of this invention which are within the full intended scope of the invention as defined by the appended claims.

We claim:

1. A method of stabilizing a polymeric insulated electrical conductor against water treeing and electrical treeing which comprises:
   coating an electrical conductor with an insulating effective amount of a polymeric insulating composition, said composition comprising an intimate admixture of a polymeric component and an effective water treeing and/or electrical treeing inhibitor amount of a compound having the general structure:

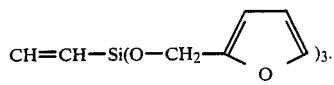

2. The method of claim 1 wherein said polymeric component is polyethylene.

3. An electrical wire or cable insulated with a polymeric composition having enhanced resistance to water treeing and electrical treeing and comprising an intimate admixture of a polymeric component and an effective water treeing and/or electrical treeing inhibitor amount of a compound having the structure:

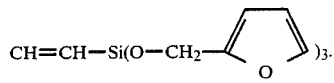

4. An electrical wire or a cable as in claim 3 wherein said polymeric component is an organic polymeric thermoplastic resin.

5. An electrical wire or cable as in claim 4 wherein said thermoplastic resin is an olefin polymer.

6. An electrical wire or cable as in claim 5 wherein said olefin polymer is a polyolefin.

7. An electrical wire or cable as in claim 6 wherein said polyolefin is polyethylene.